United States Patent
Aquilar et al.

(10) Patent No.: US 6,490,678 B1
(45) Date of Patent: Dec. 3, 2002

(54) COMBINATION EDITABLE AND FIXED ENTRY INPUT MENU FIELD USED IN A MENU FOR A COMPUTER SYSTEM PRIOR TO EXECUTION OF AN OPERATING SYSTEM

(75) Inventors: Maximino Aquilar, Austin, TX (US); Mark Earl Plunkett, Oronoco, MN (US); James Michael Stafford, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/397,607

(22) Filed: Sep. 16, 1999

(51) Int. Cl.[7] .......................... G06F 9/445; G06F 15/177
(52) U.S. Cl. ............................. 713/2; 345/966; 345/969
(58) Field of Search ........................ 713/2, 1; 345/969, 345/966, 744

(56) References Cited

U.S. PATENT DOCUMENTS 5,694,610 A * 12/1997 Habib et al. ................. 345/808
6,342,907 B1 * 1/2002 Petty et al. .................. 345/708

* cited by examiner

Primary Examiner—Thomas Lee
Assistant Examiner—James K. Trujillo
(74) Attorney, Agent, or Firm—J. Bruce Schelkopf; Andrew J. Dillon

(57) ABSTRACT

A combination editable and fixed entry input menu field may be used to set up options and preferences for a computer system, such as in a menu for booting the computer system. The menu field provides flexibility in switching and/or selecting between various selections such as operating system(s). The menu field uses less non-volatile memory for storing strings that specify the boot path and filenames and also uses less space on the menu for displaying the strings that specify the boot path and filenames. Entry fields comprise various selections such as at least one editable selectable field and at least one fixed selectable field. The user is able to choose within the selected selectable field between various selections such as between an editable field with editable entries and a fixed field with fixed entries as being the selected entry field.

19 Claims, 3 Drawing Sheets

Fig. 2

```
MENU08.3              IBM Network Station                        2 of 4
                 Change boot file server settings Boot file server IP address:
    First  . . . . . . . . . . . . . . . . . . . . [ 0.0.0.0 ] +
    Second . . . . . . . . . . . . . . . . . . . . [ 0.0.0.0 ]
    Third  . . . . . . . . . . . . . . . . . . . . [ 0.0.0.0 ]

Boot file server directory and file name:
    First  . . . . . . . . [ ] +
    Second . . . . . . . . /QIBM/ProdData/NetworkStationV2/x86/kernel.2800
    Third  . . . . . . . . /NetworkStationV2/prodbase/x86/kernel.2800

Boot file server protocol:
    TFTP . . . . . . . . . . . . . . . . . . . . . First
    NFS  . . . . . . . . . . . . . . . . . . . . . Disabled System root directory
    [ 0.0.0.0 ] /QIBM/ProdData/NetworkStationV2/x86/kernel.2800

Use cursor keys to select task, page up or down to select option.
                   IP address in the form of d.d.d.d Enter=Continue    F3=Save and return    F7=Back    F11=Undo    F12=Cancel
```

COMBINATION EDITABLE AND FIXED ENTRY INPUT MENU FIELD USED IN A MENU FOR A COMPUTER SYSTEM PRIOR TO EXECUTION OF AN OPERATING SYSTEM

BACKGROUND OF THE INVENTION

1. Technical Field

The present invention relates in general to a combination editable and fixed entry input menu field in a menu for a computer system, and, in particular, to a method and system for providing a combination editable and fixed entry input menu field that provides and allows flexibility in switching and selecting between selectable fields wherein each of the selectable fields is able to provide and allow a user to choose between an editable selectable field(s) that each stores and provides editable entries and a fixed selectable field(s) that each stores and provides fixed entries. Still more particularly, the combination editable and fixed entry input menu field provides and allows flexibility in switching and selecting between setting up the booting by the computer system to a network under an operating system(s) having a conventional or standard path and filenames for boot up to a network and an operating system(s) having a less conventional or more customized path and filenames for boot up to a network.

2. Description of the Related Art

Menus are used by a computer system for setting up and/or selecting various preferences, options, and other such data or settings. At times, these preferences and options may be provided and stored as standard, conventional, and generally fixed information or data that is typically used and specified in the menu, and at other times, these preferences and options may be provided and stored as customized or less conventional information or data that need to be manually inputted or edited in the menu. Menus that allow a user to select a selection field and then choose within the selection field between one of the editable fields with editable entries and/or one of the fixed fields with fixed entries generally do not exist, and it would be advantageous and desirable to have such selection fields for menus.

One example of such menus and menu fields are boot up menus with menu fields to set up the boot up preferences and options. Various methods and manners on how a computer system initializes and boots up over a network presently exist. Generally, when a computer system boots up to a network, the computer system requires identification of the appropriate path(s) and filenames of various files and information in order to properly load and to begin operating and running on the network under the respective operating system. For example, if the computer system were installed under a normal Microsoft® NT ("NT") operating system installation and were running under the NT operating system, then the computer system would have to be specified with and take the appropriate NT path or paths and filenames to the server(s) on the network when booting thereon. If the computer system were installed under an AIX operating system installation and were running under the AIX operating system, then the computer system would have to be specified with and take the appropriate AIX path or paths and filenames to the server(s) on the network when booting thereon. If the computer system were installed under an AX400 operating system installation and were running under the AX400 operating system, then the computer system would have to be specified with and take the appropriate AX400 path or paths and filenames to the server(s) on the network when booting thereon. If the computer system were installed under a customized or entirely different type of operating system installation and were running under this customized or entire different operating system, the computer system would have to be specified with and take path or paths and filenames to the server(s) on the network that support this operating system when booting thereon.

Most networks have a protocol in order to facilitate communications with computer systems. A network typically has at least various servers, and each server is set up to recognize each computer system. Thus, the computer system needs to load or be directed to and access information, programs, or files with filenames and addresses wherein the information, programs, or files are on the network. The information, programs, or files are identified and specified by paths and filenames that are generally non-volatile data, and the paths and filenames are typically maintained by the computer system in non-volatile memory. For example, in booting up onto the network, the computer system would store the Internet protocol addresses of the server on the network and the name of the boot up file to download from the server.

Generally, a boot up menu field is provided for setting up the boot process. The boot up menu field is activated by a sequence of keys that halts the boot up process and displays the menu. The menu allows the user to set up preferences and selected or specified options for the boot up process. The path and filenames for booting up the respective operating system is specified in this menu. The menu field requires an ASCII string as an input for storing the path and filenames. Some problems related to these ASCII strings are limitations of space on the screen for displaying the menu and storage space in non-volatile memory to store the ASCII string. For example, the ASCII string for the path may be ten characters long. Three to four different filenames may be used in the path. However, only five hundred twelve (512) bytes of non-volatile memory typically exist for storing all this information. Thus, space on the menu and space in non-volatile memory are both very limited for respectively displaying and storing the path and filenames used for boot up by the computer system. The conventional method of displaying and saving this network boot up information for the computer system requires that the entire ASCII string be typed and displayed on the menu screen and saved into the non-volatile memory. Thus, valuable or limited menu space and non-volatile memory space are easily used up by the display and storage of the paths and filenames.

The menu field is typically set up with a particular conventional default path and filenames for boot up of the computer system to a network. Paths and filenames for conventional operating systems or operating systems that are set up and saved in a conventional manner are usually fairly easy to identify, specify, and save as default settings. However, non-conventional or customized operating systems or operating systems that are set up or saved in a less conventional or more customized manner require the more tedious task of inputting and maintaining the appropriate path(s) and filenames and the accurate identification and specification of the default path(s) and filenames within the menu and the maintenance and storage of the path(s) and filenames in non-volatile memory. The present menu field does not provide nor allow a significant amount of flexibility in switching and selecting between setting up the booting under an operating system(s) having a conventional or standard path and filenames (i.e. accessing generally editable path and filenames) for boot up to a network and an operating system(s) having a less conventional or more customized path and filenames (i.e. accessing generally fixed path and filenames) for boot up to a network.

It is therefore advantageous and desirable to provide a combination editable and fixed entry input menu field used in a menu for a computer system wherein the menu field provides a selection field(s) wherein each selection field has entry fields that allow a user to select and/or switch between various selections such as an editable field with editable data and a fixed field with fixed data as being the selected entry field. It is further advantageous and desirable to provide a combination editable and fixed entry input menu field used during a boot process of a network computer system. It is also advantageous and desirable to provide a menu field that provides and allows flexibility in more easily switching and/or selecting between setting up the booting under an operating system(s) having a conventional or standard path and filenames for boot up to a network and an operating system(s) having a less conventional or more customized path and filenames for boot up to a network. It is further advantageous and desirable to provide a menu field that uses less non-volatile memory for storing the ASCII string input that specifies and identifies the boot path and filenames for booting a computer system under an operating system to a network. It is still advantageous and desirable to provide a menu field that uses less or minimizes the use of space on the menu for displaying the ASCII string input that specifies the boot path and filenames for booting a computer system under an operating system to a network.

SUMMARY OF THE INVENTION

It is therefore an object of the present invention to provide a combination editable and fixed entry input menu field used in a menu for a computer system wherein the menu field provides a selection field(s) wherein each selection field has entry fields that allow a user to select and/or switch between various selections such as an editable field with editable data and a fixed field with fixed data as being the selected entry field.

It is therefore another object of the present invention to provide a combination editable and fixed entry input menu field used during a boot process of a network computer system.

It is another object of the present invention to provide a menu field that provides and allows flexibility in more easily switching and/or selecting between setting up the booting under an operating system(s) having a conventional or standard path and filenames for boot up to a network and an operating system(s) having a less conventional or more customized path and filenames for boot up to a network.

It is a further object of the present invention to provide a menu field that uses less non-volatile memory for storing the ASCII string input that specifies and identifies the boot path and filenames for booting a computer system under an operating system to a network.

It is still another object of the present invention to provide a menu field that uses less or minimizes the use of space on the menu for displaying the ASCII string input that specifies the boot path and filenames for booting a computer system under an operating system to a network.

The foregoing objects are achieved as is now described. A combination editable and fixed entry input menu field is a field within a menu displayed on a computer screen. The menu field is used to set up options and preferences for a computer system, such as in a boot up menu for booting the computer system to a network. The menu field provides and allows flexibility in more easily switching and/or selecting between various selections such as setting up the network booting under a conventional and non-conventional operating system(s). The menu field uses less non-volatile memory for storing strings that specify the boot path and filenames and also uses less space on the menu for displaying the strings that specify the boot path and filenames. Selectable fields with entry fields are provided for the combination menu field. Entry fields comprise various selections such as at least one editable selectable field and at least one fixed selectable field. Editable selectable field(s) allows entries to be edited therein and changably saved into a memory system. Fixed selectable field(s) allows entries to be fixed therein and unchangably saved into the memory system. One of the selectable fields is selected. The user is able to scroll through the entry fields in the selected selectable field. One of the entry fields within the selected selectable field is selected. The user is able to choose within the selected selectable field between various selections such as between an editable field with editable entries and a fixed field with fixed entries as being the selected entry field.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a computer display screen of the boot up menu showing the present invention combination editable and fixed entry input menu field.

DESCRIPTION OF A PREFERRED EMBODIMENT

The present invention combination editable and fixed entry input menu field is a field within a menu that is able to be displayed on a computer screen. The present combination menu field provides a selection field(s) wherein each selection field has entry fields that allow a user to select and/or switch between various selections such as an editable field with editable data and a fixed field with fixed data as being the selected entry field. The menu may be a boot up menu. The present invention menu field is used to set up options and preferences, particularly for specifying paths and filenames, for a process of a computer or computer system to a network, such as a boot up process. For example, the present invention provides a menu field that provides and allows flexibility in more easily switching and/or selecting between setting up the network booting under an operating system(s) having a conventional or standard path and filenames for allowing a computer system to boot up to a network and an operating system(s) having a less conventional or more customized path and filenames for allowing the computer system to boot up to a network. The present invention provides a menu field that uses less non-volatile memory for storing the ASCII string input that specifies and identifies the boot path and filenames for booting a computer system under an operating system to a network and that also uses less or minimizes the use of space on the menu for displaying the ASCII string input that specifies the boot path and filenames for booting a computer system under an operating system to a network. The present invention is not in any way limited to just being used for the boot up process and with boot up menus, and it may be used in conjunction with any suitable computer processes and menus.

The present invention is able to be implemented or executed on different types of computers or computer systems under a number of different bootstrap programs and operating systems wherein the computers or computer systems are booting up to a network. The computer or computer system may be, for example, a personal computer, a midrange computer, a network computer or a mainframe computer. In addition, the computer may be part of a network such as a local-area network (LAN) or a wide-area network (WAN). An example of a typical computer or computer system in which the present invention is implemented and executed is the International Business Machine (IBM®) Network Station.

Figure 1:
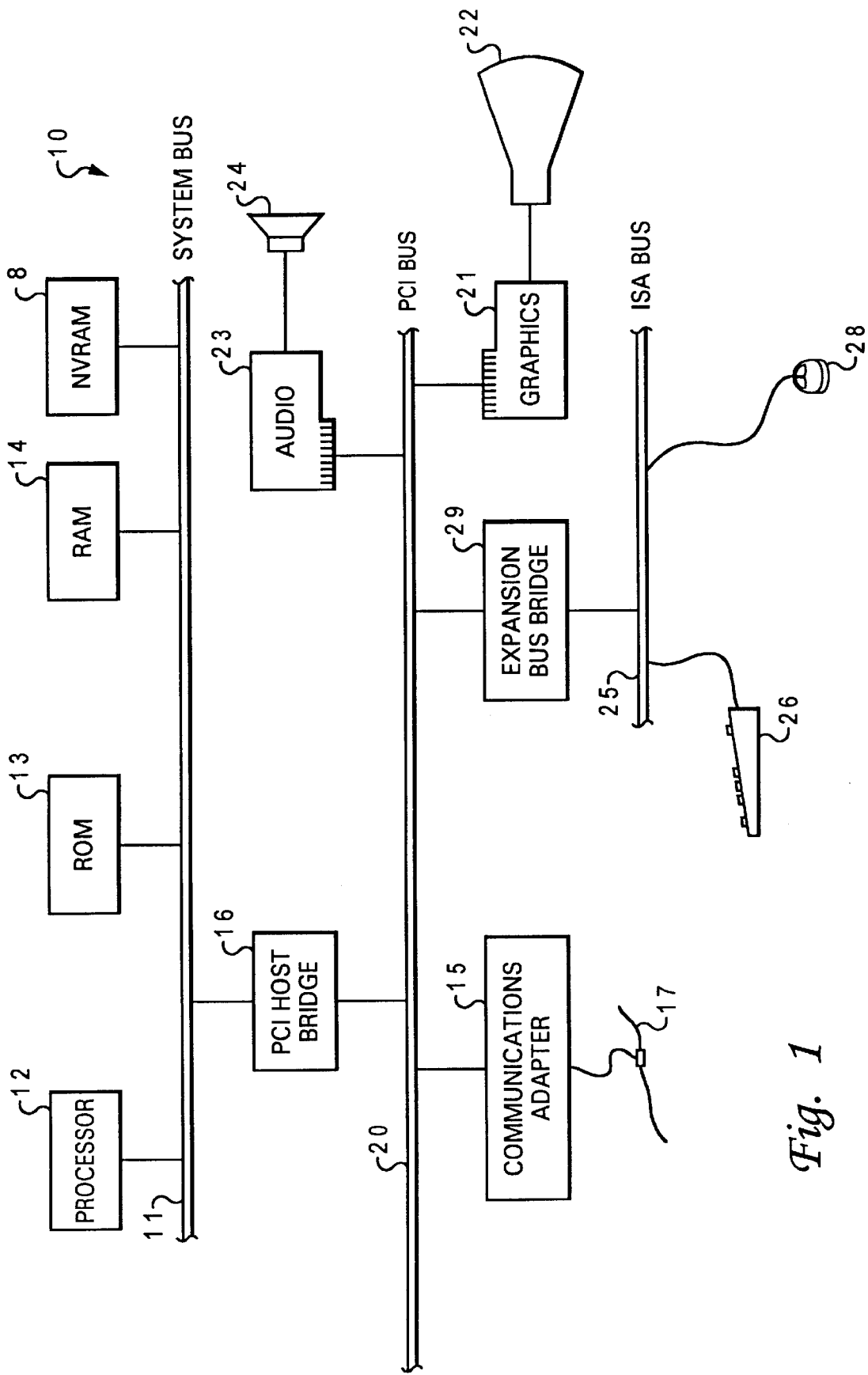
FIG. 1 is a block diagram of a typical computer system that is able to utilize and implement a preferred embodiment of the present invention combination editable and fixed entry input menu field.

With reference now to the figures and in particular with reference to FIG. 1, a block diagram of a typical computer system 10 that is able to utilize and implement a preferred embodiment of the present invention combination editable and fixed entry input menu field is shown. As shown, a central processing unit (CPU) 12, a read-only memory (ROM) 13, a random-access memory (RAM) 14, and non-volatile random-access memory (NVRAM) 8 are coupled to a system bus 11 of the computer system 10. CPU 12, ROM 13, RAM 14 and NVRAM 8 are also coupled to a peripheral component interface (PCI) local bus 20 of computer system 10 through a PCI host bridge 16. PCI host bridge 16 provides a low latency path through which processor 12 may directly access PCI devices mapped anywhere within bus memory and/or input or output (I/O) address spaces. PCI host bridge 16 also provides a high bandwidth path for allowing PCI devices to directly access RAM 14.

Also, communications adapter 15 and expansion bus bridge 29 are attached to PCI local bus 20. The communications adapter 15 is for coupling the computer system 10 to a communication device 17 or a network, such as a local area network (LAN) or a wide area network (WAN). Expansion bus bridge 29, such as a PCI-to-industry standard architecture (ISA) bus bridge, may be utilized for coupling ISA bus 25 to PCI local bus 20. As shown, a keyboard 26 and a mouse 28 are attached to ISA bus 25 for performing certain basic I/O functions. In addition, an audio adapter 23 is attached to PCI local bus 20 for controlling audio output through speaker 24. A graphics adapter 21 is also attached to PCI local bus 20 for controlling visual output through display monitor 22.

The present invention provides for multiple inputs into the menu field to provide alternate choices or selections (i.e. boot up preferences and options) when executing or implementing a process, such as booting the computer system 10 to a network. With reference now to the figures and in particular with reference to FIG. 2, a display screen 30 shows a boot up menu 31 for the computer system 10 wherein the boot up menu 31 is used to set up and select various preferences and options for the computer system 10 to execute a process, such as boot up to a network. The menu 31 shows the combination editable and fixed entry input menu field 32 with selection fields 36, 38, and 40 having respective entry fields 37, 39, and 41. The selection fields 36, 38, and 40 each allows for multiple choices or selections that are able to be scrolled through on a single line or expanded to several lines within each of the respective entry fields 37, 39, and 41.

For example, the user is able to choose between the selection fields 36, 38, and 40. Alternatively, a boot up algorithm or process is set up such that the computer system 10 defaults and selects to executing from selection field 36, then from selection field 38 if selection field 36 is not appropriate, and then from selection field 40 selection fields 36 and 38 are not appropriate. In the present preferred embodiment, if the first selection field 36 is selected, then the user is able to choose in the entry field 37 of the selection field 36 between various entry selections such as an editable field with editable entries and three fixed fields with fixed entries. Also, if the second selection line 38 is selected, then the user is able to choose in the entry field 39 of the selection field 38 between various selections such as an editable field with editable entries and three fixed fields with fixed entries. Furthermore, if the third selection line 40 is selected, then the user is able to choose in the entry field 41 of the selection field 40 between various selections such as an editable field with editable entries and three fixed fields with fixed entries. For example, the editable field have editable entries that are paths and filenames used to boot the computer system 10 under a less conventional operating system to a network. The fixed fields have fixed entries that are paths and filenames used to boot the computer system 10 under a more conventional operating system.

FIG. 2 shows that the combination editable and fixed entry input menu field 32 is set up as follows for a boot up menu 31: The first selection field 36 has an editable field selected as the selection in its entry field 37. The editable field is indicated by the symbol "[ ]+". A directory/path and filenames are able to be specified in the entry field 37 within the "[ ]+" wherein the directory/path and filenames allow booting of the computer system 10 under a non-conventional operating system to a network. The second selection field 38 has a fixed field selected as its selection in its entry field 39. The fixed field in entry field 39 is set to be the following directory/path and filenames: "/QIBM/ProdData/NetworkStationV2/x86/kernel.2800" wherein this directory/path and filenames allow booting of the computer system 10 under a conventional operating system to a network. The third selection field 40 also has a fixed field selected as its selection in its entry field 41. The fixed field in entry field 41 is set to be the following directory/path and filenames: "/NetworkStationV2/prodbase/x86/kernel.2800" wherein this directory/path and filenames allow booting of the computer system 10 under an alternative conventional operating system to a network. As stated earlier, each of the selection fields 36, 38, and 40 allows for multiple choices or selections that are able to be scrolled through on a single line (as shown in FIG. 2) or expanded to several lines within each of the entry fields 37, 39, and 41.

In the editable field shown in the entry field 37 of selectable field 36, the path and filenames are able to be edited and inputted therein, and the data in this editable field are generally non-conventional, less conventional, or more customized paths and filenames for booting up the computer system 10 to a network through a generally non-conventional, less conventional, or more customized operating system. These operating systems generally would not provide or specify standard or conventional paths, directories, and filenames for booting up the computer system 10 to a network. The editable field is a field that identifies and specifies boot file server directory/paths and file names under which the computer system 10 is able to boot to a network. The path(s)/directory(ies) and filename(s) are manually inputted at or typed or edited by the user in this editable field and are saved into the NVRAM 8 of computer system 10.

Editable strings (i.e. ASCII strings) that have associated editable boot file server directories and filenames are set up and used in this editable field. Thus, the paths, directories, and filenames have to be manually specified in the boot up menu 31 to set the appropriate preferences and options for network boot up. As shown in FIG. 2, the editable field shows a blank space or editable area "[ ]+" to be typed in and filled with the appropriate file server directory(ies) and filename(s). An editable field that is a choice or selection in the combination editable and fixed entry input field 32 in FIG. 2 is indicated by the symbol "[ ]+". For example, if a string such as "/directory/file.name" has been entered into the editable field in the boot file server directory and file name area, then it would appear as "[/directory/file.name]+" in the menu 31.

In the fixed fields shown in the entry fields 39 and 41 of respective selectable fields 38 and 40, the paths and filenames are fixed, and they are typically conventional or standard paths and filenames for booting up the computer system 10 to a network through a conventional or standard operating system. Examples of such conventional or standard operating systems are Microsoft® NT, AIX, or AX400 wherein standard setups of these operating systems would provide and specify the standard or conventional paths/directories and filenames for boot up of the computer system 10 under the respective operating system to a network. Also, the fixed fields would include the values that are most commonly used by the computer system 10 for booting up to a network. Fixed and uneditable strings that have associated fixed boot file server directories/paths and filenames are set up and used in these fixed fields. FIG. 2 further shows that the boot file server directory and file name in the fixed field 39 of the second selection field 38 is fixed and set as "/QIBM/ProdData/NetworkStationV2/x86/kernel.2800" and that the boot file server directory and file name in the fixed field 41 of the third selection field 40 is fixed and set as "/NetworkStationV2/prodbase/x86/kernel.2800".

Various keys are defined for controlling display and the cursor within the menu 31 and in the combination editable and fixed entry input menu field 32. A scroll key is defined as the key that allows scrolling between the various selections in the entry field of a selectable field. The scroll key causes the next item or selection in the field to be displayed and the current item or selection to be saved if it is editable. A preferred implementation defines the Page Up and the Page Down keys as the scroll key. For example, if the cursor is on a selection in the entry field 37 and a page up or down is depressed, then the cursor would appear on another selection in the fixed entry field 37. If scrolling is continued through the entry field 37 of selectable field 36, then eventually, the editable field will reappear with the value that was previously entered or saved in the NVRAM 8 at the last time of editing the editable field. An edit key is defined as any key used to enter text. Edit keys include but are not limited to text characters, backspace, cursor left, and cursor right in the preferred implementation. A completion key is defined as any key that completes the entry of a field. Also, in the preferred implementation, the enter or tab key is defined as the completion key.

One of the key advantages that the combination editable and fixed entry input menu field 32 provides is the use of less memory space in the NVRAM 8 to display and store preferences and options for a menu. For example, in a preferred embodiment, the present invention may be set up so that the boot up preferences and options for a fixed field in a selectable field is represented by only one byte in the non-volatile memory (NVRAM 8). The present invention would further be set up so that each character in the string inputted into an editable field would require one byte of storage in the non-volatile memory (NVRAM 8). Also, space on the menu 31 on the display screen 30 is able to be saved by simply displaying the one byte character instead of the entire ASCII string on the screen 30 for the preferences and options for the fixed fields.

Furthermore, in a preferred implementation, the user selects between either an editable field or one of three fixed fields as selections within the entry fields 37, 39, and 41. The three fixed fields may each include long strings that use a large portion of the limited non-volatile memory (i.e. NVRAM 8). The pre-defined, fixed string selections or choices that are each represented by a single byte are able to be used for one or more of the three choices. Thus, this preferred implementation generally results in much less of a requirement for non-volatile memory (i.e. NVRAM 8) and still provides the flexibility of supporting unique user defined input of path and filename specifications. Generally, in most cases, the user is able to simply select one of the "pre-defined" entries (i.e. from a fixed field) rather than having to input or type in a string (i.e. into an editable field).

Figure 3:
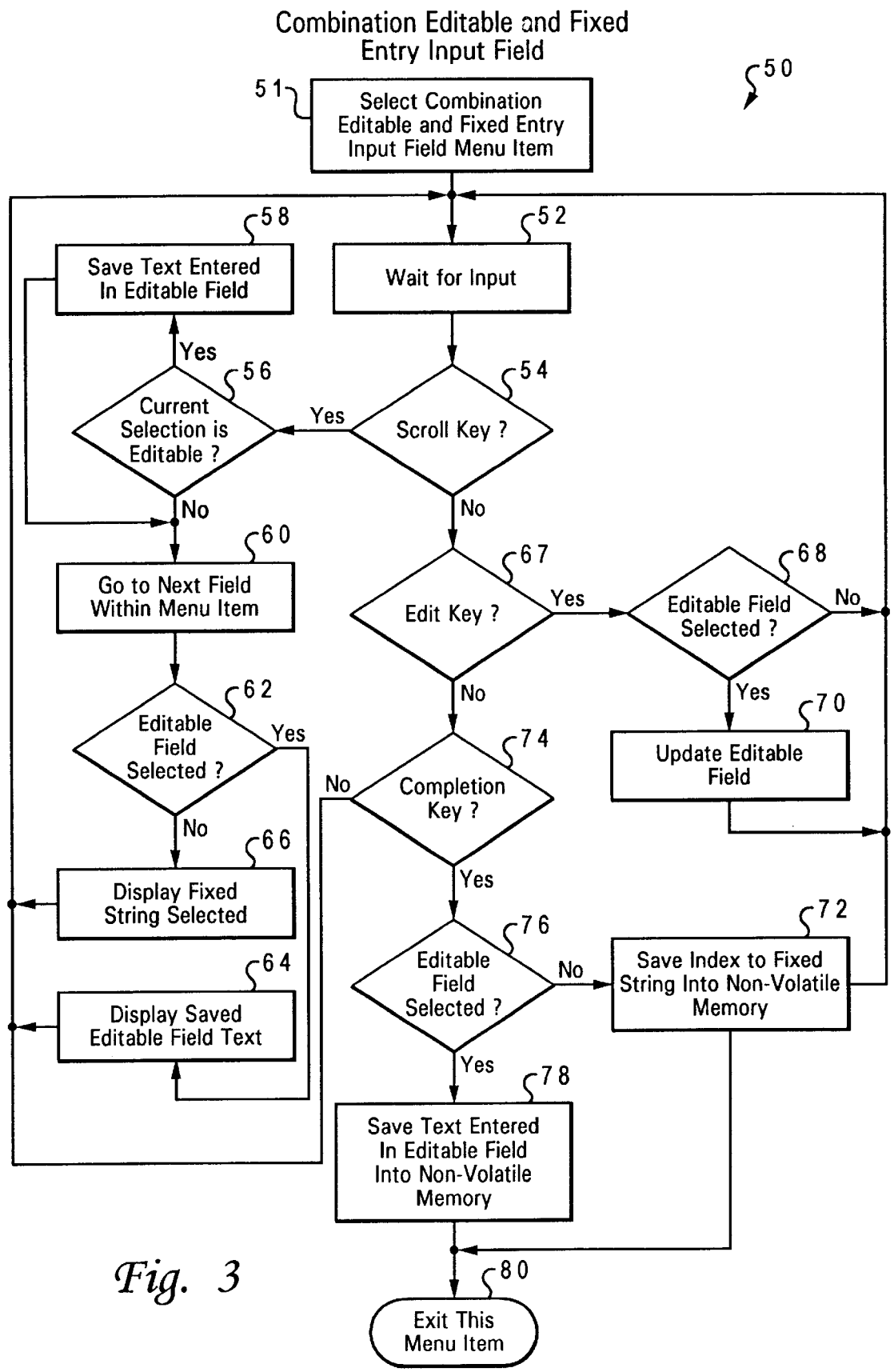
FIG. 3 a flow chart of an example algorithm for providing, implementing, and displaying the present invention combination editable and fixed entry input menu field in a boot up menu that is able to be displayed on a computer screen wherein the menu field provides selectable fields with entry fields that are each able to be selected by the user.

With reference now to the figures and in particular with reference to FIG. 3, a flow chart 50 of an example algorithm for implementing and displaying the present invention combination editable and fixed entry input menu field 31 in a boot up menu 30 is shown. One of the selectable fields (i.e. field 36, 38, or 40) in the menu item or in the combination editable and fixed entry input field 31 of the menu 30 is selected by the user. The algorithm 50 waits for the input from the user at block 52. An input would be the activation of one of the keys such as the scroll key, edit key, and completion key as defined above. At decision block 54, the algorithm 50 determines whether a scroll key has been activated or depressed by the user. If a scroll key has been activated, then the algorithm 50 moves to decision block 56.

At decision block 56, the algorithm 50 determines whether the current selection in the selected entry field (such as field 37, 39, or 41) is an editable field. If the current selection in the selected entry field is an editable field, then the algorithm 50 moves to block 58. At block 58, the text entered into the editable field is saved, and the algorithm 50 continues at block 60. If the current selection in the selected entry field is not an editable field, then the algorithm 50 moves directly to block 60. At block 60, the algorithm 50 goes to the next selectable entry field within the selected selectable field. The algorithm 50 then moves to decision block 62. At decision block 62, the algorithm 50 determines whether the selection in the next selectable entry field that has been selected is an editable field. If it is an editable field at decision block 62, then the algorithm 50 moves to block 64 where the saved editable field text is displayed on the menu 31, and the algorithm 50 loops before block 52 where it continues therefrom. On the other hand, if it is not an editable field at decision block 62, then the algorithm 50 moves to block 66 where a fixed string corresponding to the fixed selected field is displayed on the menu 31, and the algorithm 50 loops before block 52 where it continues therefrom.

If a scroll key was not activated at decision block 54, then the algorithm 50 moves directly to decision block 67. At decision block 67, the algorithm 50 determines whether an edit key has been activated or depressed. If an edit key has been activated, then the algorithm 50 moves to decision block 68. At decision block 68, the algorithm 50 determines whether an editable field has been selected as the entry field within the selected selectable field. If an editable field has been selected as the entry field at decision block 68, then the algorithm 50 moves to block 70. At block 70, the algorithm 50 updates the editable field, and the algorithm 50 loops back before block 52 and continues therefrom. On the other hand, if an editable field has not been selected at decision block 68, then the algorithm 50 directly loops back before block 52 and continues therefrom.

If an edit key has not been activated or depressed at decision block 67, then the algorithm 50 directly moves to decision block 74. At decision block 74, the algorithm 50 determines whether a completion key has been activated or depressed. If a completion key has been activated or depressed at decision block 74, the algorithm 50 moves to decision block 76. At decision block 76, the algorithm 50 determines whether an editable field has been selected as the entry field within the selected selectable field. If an editable field has been selected at decision block 76, then the algorithm 50 moves to block 78 where the text entered in the editable field is saved into non-volatile memory (i.e. NVRAM 8), and the algorithm 50 then exits the selected selectable field at block 80. On the other hand, if an editable field has not been selected at decision block 76, then the algorithm 50 moves to block 72 where the index to the fixed string or character representation for the fixed string associated to the fixed selectable field is saved into non-volatile memory (i.e. NVRAM 8), and the algorithm 50 then loops back before block 52 and continues therefrom. However, if a completion key has not been activated or depressed at decision block 74, then the algorithm 50 loops back before block 52 and continues therefrom.

While the invention has been particularly shown and described with reference to a preferred embodiment, it will be understood by those skilled in the art that various changes in form and detail may be made therein without departing from the spirit and scope of the invention.

What is claimed is:

1. A method, comprising:
    displaying a menu field having an associated plurality of user-selectable entries, wherein at least one of the user-selectable entries is displayed within the menu field, and wherein the plurality of user-selectable entries includes at least one fixed entry that is not user-editable and at least one editable entry that is user-editable;
    allowing user selection of any of the plurality of entries associated with the menu field;
    in response to user selection of the editable entry, permitting the user to enter data into the editable entry to modify the editable entry utilizing an input device; and
    in response to a selected user input, the computer executing a process based upon a user-selected entry among the plurality of user-selectable entries associated with the menu field.

2. The method according to claim 1, wherein the at least one editable entry comprises an editable boot entry and the fixed entry comprises a fixed boot entry, and wherein executing the process comprises booting the computer system based on a user-selected one of the editable boot entry and the fixed boot entry.

3. The method according to claim 2, wherein said displaying comprises:
    displaying at least one fixed entry including at least one path and filename.

4. The method according to claim 3, wherein the permitting step comprises:
    inputting an editable path and filename textual string into said editable field; and
    storing the editable path and filename string into memory.

5. The method according to claim 4, further comprising:
    representing each character of the editable path and filename string utilizing a single byte.

6. The method according to claim 1, wherein said menu field is a first of a plurality of menu fields, and wherein:
    said displaying comprises displaying the plurality of menu fields; and
    said allowing comprises allowing the user to select an entry within each of the plurality of menu fields from among a respective plurality of entries associated with each field that includes a fixed entry and an editable entry.

7. The method of claim 1, and further comprising storing said modified editable entry within data storage.

8. A data processing system comprising:
    a display;
    a processor coupled to the display; and
    data storage coupled to the processor, said data storage including a menu-driven program executable by the processor prior to execution of an operating system, wherein said menu-driven program displays a menu field having an associated plurality of user-selectable entries, wherein at least one of the user-selectable entries is displayed within the menu field, and wherein the plurality of user-selectable entries includes at least one fixed entry that is not user-editable and at least one editable entry that is user-editable, and wherein said menu-driven program allows user selection of any of the plurality of entries associated with the menu field and, responsive to user selection of the editable entry, permits the user to enter data into the editable entry to modify the editable entry utilizing an input device, wherein, responsive to a selected user input, the menu-driven program causes the data processing system to execute a process based upon a user-selected entry among the plurality of user-selectable entries associated with the menu field.

9. The data processing system of claim 8, wherein the at least one editable entry comprises an editable boot entry and the fixed entry comprises a fixed boot entry and wherein the process comprises a boot process that boots the data processing system based on a user-selected one of the editable boot entry and the fixed boot entry.

10. The data processing system of claim 9, wherein the fixed entry includes at least one path and filename.

11. The data processing system of claim 10, wherein the menu-driven program stores, within data storage, a textual path and filename string entered into the editable field.

12. The data processing system of claim 11, wherein said data storage stores each character of the textual path and filename string utilizing a single byte.

13. The data processing system of claim 8, wherein said menu field is a first of a plurality of menu fields, and wherein said menu-driven program displays the plurality of menu fields that each allow a user to select an entry from among a respective plurality of entries associated with each field that includes a fixed entry and an editable entry.

14. A program product, comprising:

a computer-usable medium; and a menu-driven program within the computer-usable medium, wherein when executed by a data processing system prior to execution of an operating system, said menu-driven program displays a menu field having an associated plurality of user-selectable entries, wherein at least one of the user-selectable entries is displayed within the menu field, and wherein the plurality of user-selectable entries includes at least one fixed entry that is not user-editable and at least one editable entry that is user-editable, and wherein said menu-driven program allows user selection of any of the plurality of entries associated with the menu field and, responsive to user selection of the editable entry, permits the user to enter data into the editable entry to modify the editable entry utilizing an input device, wherein, responsive to a selected user input, the menu-driven program causes the data processing system to execute a process based upon a user-selected entry among the plurality of user-selectable entries associated with the menu field.

15. The program product of claim 14, wherein the at least one editable entry comprises an editable boot entry and the fixed entry comprises a fixed boot entry and wherein the process comprises a boot process that boots the data processing system based on a user-selected one of the editable boot entry and the fixed boot entry.

16. The program product of claim 15, wherein the fixed entry includes at least one path and filename.

17. The program product of claim 16, wherein the menu-driven program stores, within data storage, a textual path and filename string entered into the editable field.

18. The program product of claim 17, wherein each character of the textual path and filename string is represented utilizing a single byte.

19. The program product of claim 14, wherein said menu field is a first of a plurality of menu fields, and wherein said menu-driven program displays the plurality of menu fields that each allow a user to select an entry from among a respective plurality of entries associated with each field that includes a fixed entry and an editable entry.

* * * * *